Figure 1:
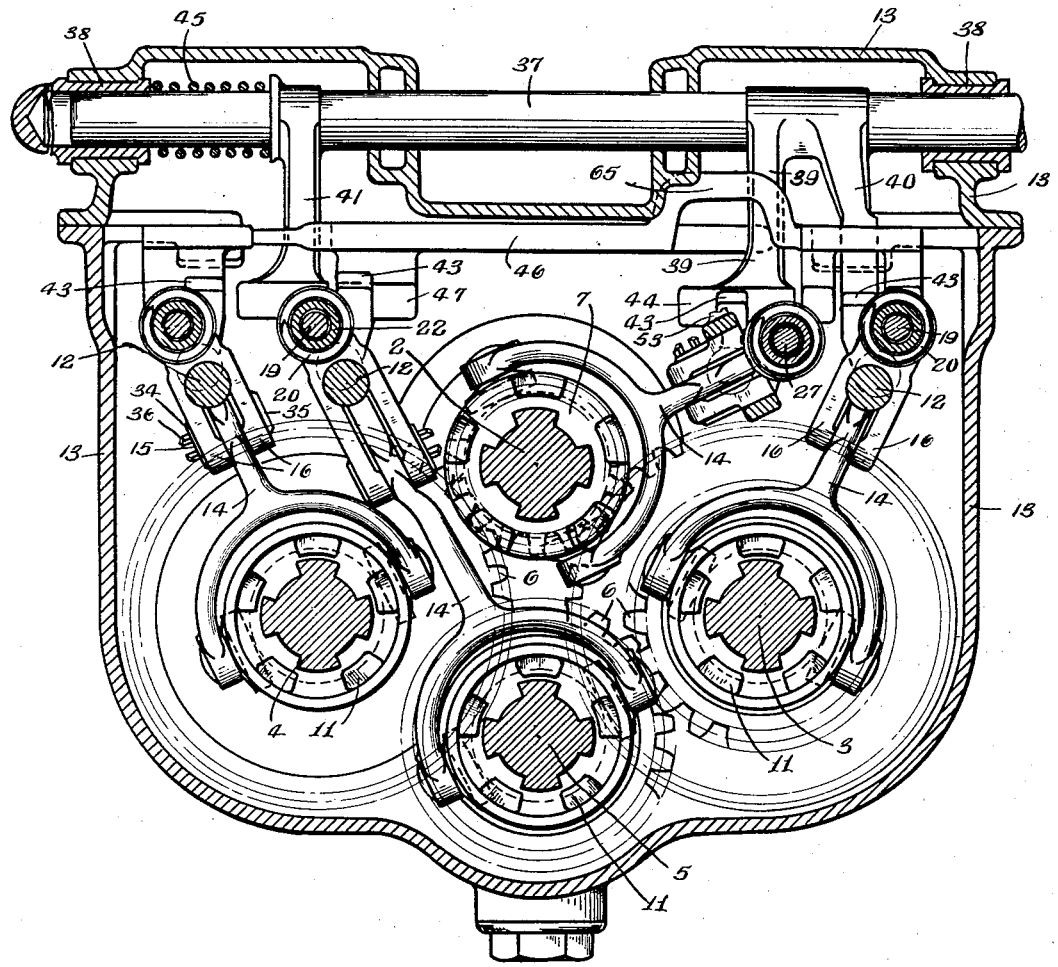

C. W. PARKER.
TRANSMISSION GEARING.
APPLICATION FILED MAY 27, 1912.
1,205,383.
Patented Nov. 21, 1916.
3 SHEETS—SHEET 2.
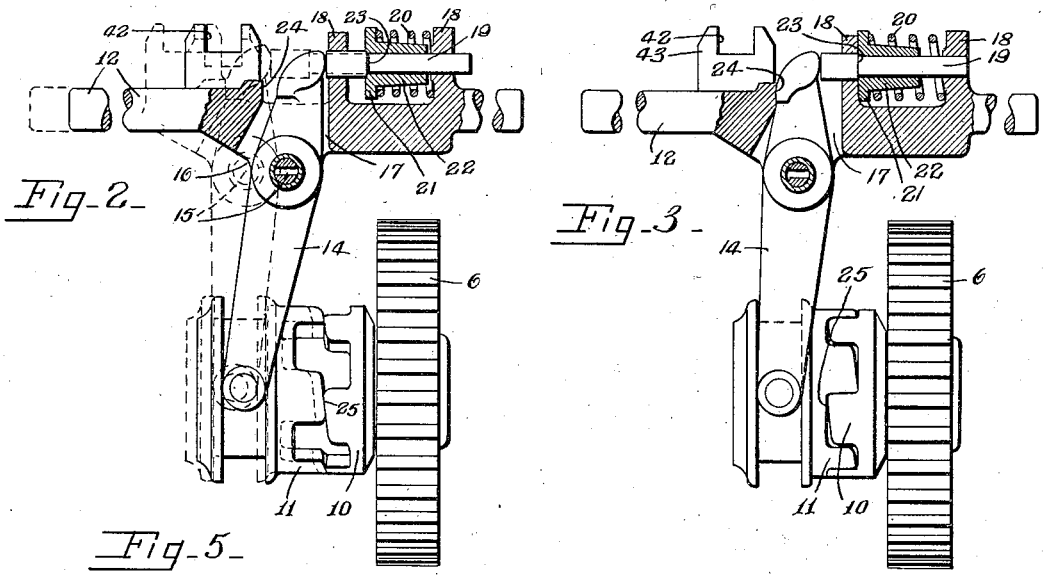
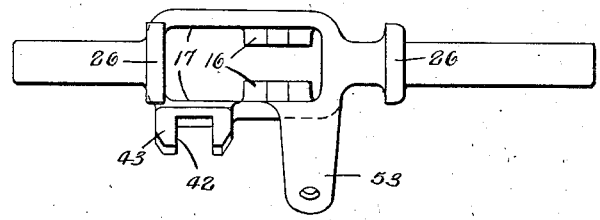
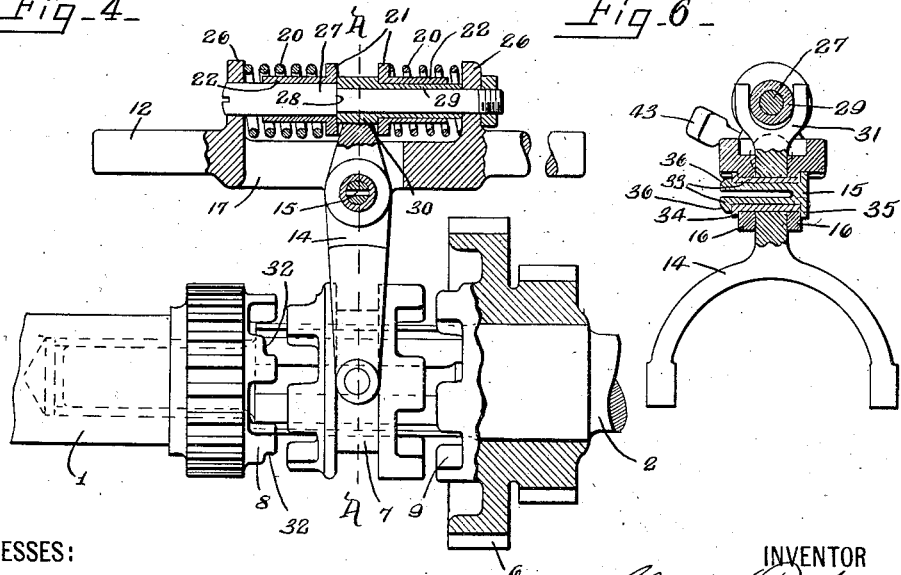
WITNESSES:
INVENTOR
Clark W Parker
BY
ATTORNEYS C. W. PARKER.
TRANSMISSION GEARING.
APPLICATION FILED MAY 27, 1912.
1,205,383.
Patented Nov. 21, 1916.
3 SHEETS—SHEET 3.
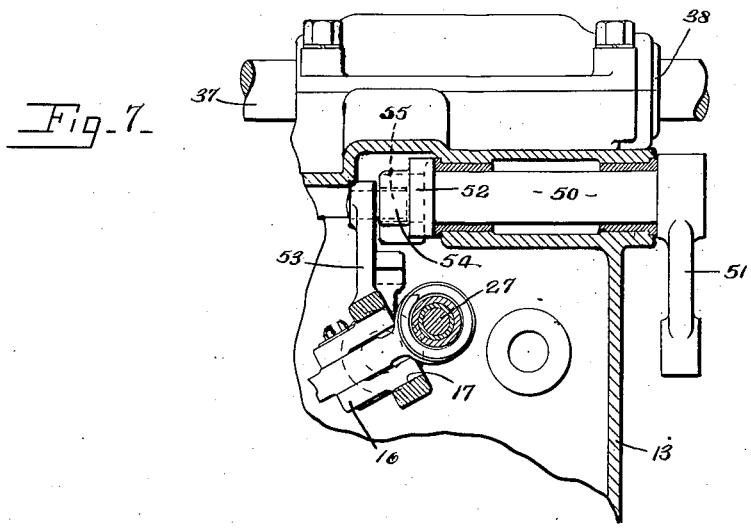
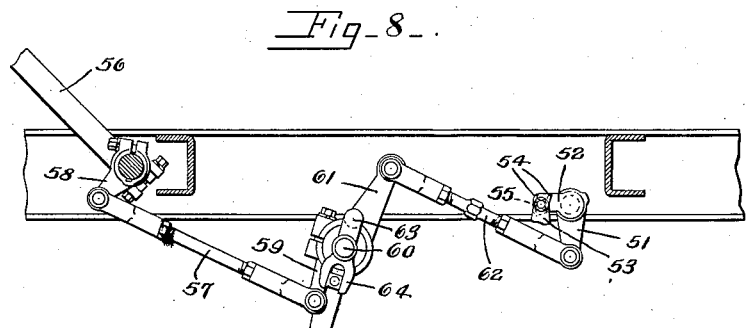
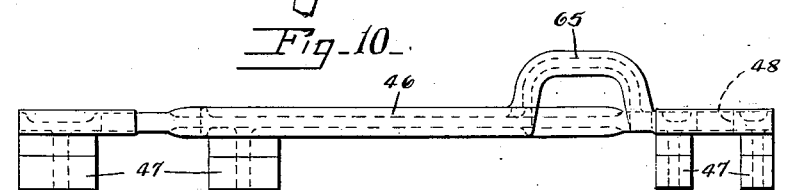
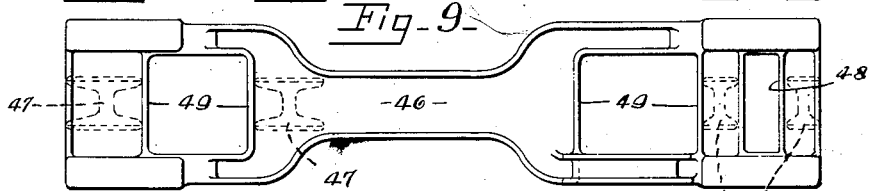
WITNESSES:
INVENTOR
Clark W. Parker
BY
Parsons Hall Bodell
ATTORNEYS

UNITED STATES PATENT OFFICE.

CLARK W. PARKER, OF FULTON, NEW YORK, ASSIGNOR, BY MESNE ASSIGNMENTS, TO JAMES H. DUNN, OF SPRINGFIELD, MASSACHUSETTS.

TRANSMISSION-GEARING.

1,205,383.      Specification of Letters Patent.      Patented Nov. 21, 1916.

Application filed May 27, 1912. Serial No. 699,931.

*To all whom it may concern:*

Be it known that I, CLARK W. PARKER, of Fulton, in the county of Oswego and State of New York, have invented a certain new and useful Transmission-Gearing, of which the following is a specification.

This invention relates to transmission gearing, particularly applicable for motor vehicles, and has for its object particularly simple and efficient means for shifting toothed power-transmitting parts of the gearing and for locking such parts from movement when in their neutral or in their shifted positions, and the invention consists in the combinations and constructions hereinafter set forth and claimed.

In describing this invention reference is had to the accompanying drawing in which like characters designate corresponding parts in all the views.

Figure 1 is a transverse sectional view of one embodiment of my gearing. Figs. 2 and 3 are detail views, partly in section, of one of the shifters and coacting parts, illustrating the operation of the fork lever and one form of yielding means for forcing shiftable toothed power-transmitting members of the gearing into interlocking engagement, the parts being shown as operating in Fig. 2, and as completely operated in Fig. 3. Fig. 4 is a detail view of the central or main shifter or carriage and contiguous parts, in neutral position. Fig. 5 is a plan of the carriage or shifter shown in Fig. 4. Fig. 6 is a sectional view, partly in elevation, on line "A—A," Fig. 4, the power-transmitting members shown in Fig. 4, being omitted. Fig. 7 is a fragmentary view of a portion of the gearing illustrating the means for locking the main clutch member from movement. Fig. 8 is a detail view illustrating the means for operating the locking means shown in Fig. 7, the contiguous portion of the frame of a motor car equipped with my invention, being also shown. Figs. 9 and 10 are plan and edge views, respectively, of the locking member.

This transmission gearing includes, generally, shiftable toothed power-transmitting members or parts, shifters connected respectively to said members, means for actuating the shifters comprising an axially movable rock shaft having a plurality of arms for coacting with the shifters, the arms being spaced apart to select two predetermined shifters upon predetermined axial movements of the rock shaft and to move the selected shifters when the shaft is rocked. The illustrated embodiment of my gearing also includes a locking element operated by the rock shaft during axial movements thereof to lock the unselected shifters, and means for locking the main shifter from movement, and also means for yieldingly forcing the shiftable toothed power-transmitting members or parts into interlocking engagement with their companion members.

The transmission gearing here illustrated comprises a driving element or shaft 1 and a driven element or shaft 2, Fig. 4, arranged in axial alinement, a plurality of intermediate shafts 3, 4, 5, Fig. 1, for producing intermediate, low and reverse speeds, the shafts 3, 4 and 5 being connected to the shafts 1, 2 by gears, as 6, which are always in mesh, and some of which are loose on their shafts and are connected thereto as will be presently described, and means for connecting the various shafts in driving relation to the driving element 1.

The arrangement of the gearing *per se* forms no part of this invention and it is thought that further description thereof is unnecessary.

The means for connecting the various shafts in driving relation with the driving shaft 1 includes a central or main toothed member, as a double clutch jaw 7, shiftable from a neutral position in opposite directions into engagement with the clutch jaws 8 and 9, on the driving and driven shafts respectively, and fixed and shiftable clutch jaws on each of the shafts 4, 5, such as the clutch jaws 10 and 11, Figs. 2 and 3. The clutch jaw 7 is movable in one direction to the left into engagement with the jaw 8 to produce direct drive or high speed, and in the opposite direction into engagement with the jaw 9 to act in conjunction with the jaws 10 and 11 on the intermediate shaft 3, and produce intermediate speed. The central or main shiftable jaw 7 is always shifted into engagement with the jaw 9 when the shiftable jaw 11 on any of the intermediate shafts 3, 4 or 5 is operated. Thus the central or main jaw is coupled with any one of the movable jaws on the intermediate shafts.

As seen in Figs. 2 and 3, the clutch jaws are shiftable and move into and out of engagement with their companion jaws by sliding shifters or carriages 12 suitably supported in guides formed in the case 13 of the gearing, and fork levers 14 pivoted to the carriages 12 and normally movable as a unit therewith, and being connected to the shiftable clutch jaws 7 and 11, and being normally held from pivotal movement by springs which are tensioned during pivotal movement of the levers.

The lever 14 for each of the jaws 7, 11 is here shown as pivoted between its ends at 15 to depending ears 16 arranged on opposite sides of a lengthwise slot 17 formed in the shifter or slide 12 and through which the lever extends, and the carriage or shifter 12 for each jaw 11 is formed with ears 18 arranged at one end of the slot 17 and in which is mounted a slidable plunger 19 arranged eccentric to the axis of the shifter 12, the plunger bearing against one end of the lever 14 and being held in engagement with the lever by a spring 20 encircling the plunger 19 and interposed between the inner face of one of the ears 18 and an annular flange or collar 21 on a sleeve 22 on the plunger 19, the sleeve 22 abutting against the annular end face of a head 23 on the plunger.

The spring 20 acting on each plunger 19 tends to hold the lever 14 against an abutment 24 at one end of the slot 17 of the shifter for each jaw 11, Figs. 2 and 3, and normally the carriage 12 and lever 14 act as a unit, but in case the ends of the teeth of the clutch jaw 11 should strike against the ends of the teeth of the jaw 10, as seen in Fig. 2, the spring 20 will yield during continued movement of the carriage 12 from the position indicated in dotted lines to that shown in full lines, Fig. 2, and will be tensioned so as to force the teeth of the jaw 11 into interlocking engagement with the teeth of the jaw 10, as shown in Fig. 3, when one of the jaws 10 or 11 has turned sufficiently to aline the teeth of the one with the spaces of the other. The ends of the teeth of the jaws 10 and 11 are preferably formed inclined as indicated at 25 in order to permit ratcheting in case the driving jaw is rotating too fast to permit the other jaw to move into interlocking engagement therewith. As the jaw 7 of the central or main clutch is shiftable in opposite directions, two springs 20, Fig. 4, are provided for acting on the lever 14 in opposite directions.

As here shown, Figs. 4 and 5, the slide 12 for the central or main jaw is formed with ears 26 at opposite ends of the slot 17 therein, these ears supporting a fixed guide rod 27 on which is mounted the sleeves 22, the sleeves being pressed toward each other by the springs 20 which are located between the annular flanges 21 on the sleeves 22 and the ears 26 respectively. One of the sleeves 22 is mounted on an elongated head at one end of the guide rod 27, the inner end face of which forms an annular shoulder 28 facing the other end of the guide rod 27; and the other sleeve 22 is mounted on an additional sleeve 29 mounted on a part of less diameter of the rod 27 and abutting at one end against one of the ears 26 and having its other end formed with an enlarged head 30 abutting against the shoulder 28, said head 30 being disposed centrally of the rod 27 and the sleeves 22 abutting against opposite end faces of such head. The sleeves 22 are thus limited in their movement toward each other by their springs 20, so that one spring 20 may be of greater strength than the other, the spring for forcing the clutch jaws 7 into engagement with the jaw 8 to produce direct drive being stronger and acting quicker than the other spring 20. The fork lever 14 for the central clutch is forked, as at 31, at its upper end, as well as at its lower end, the fork 31 extending on opposite sides of the head 30 of the sleeve 29 and engaging opposing faces of the flanges 21 of the sleeves 22. The shifter 12 for the central or main clutch, as shown in Fig. 4, is movable in opposite directions from a neutral position, and one of the springs 20 thereof is arranged to yield when the shifter is moved in one direction and the teeth of the clutches 7, 8 clash at their ends, and the other spring 20 will yield when the shifter is moved in the opposite direction and the teeth of the clutches 7, 9 clash at their ends.

As before stated, the jaws 7, 8 produce high speed forward, or direct drive, and, preferably, the entrance of the teeth of the clutch 8 are formed stepped, as shown at 32, for facilitating the engagement of the teeth especially when the jaw 7 is turning at high speed, as when the car is coasting down hill with the engine "dead," and it is desired to start the engine as the car approaches the bottom of the hill, by clutching the driving shaft 1 which is connected to the engine shaft, as will be understood by those skilled in the art, with the clutch jaw 7 which is rotating by reason of the fact that it is being driven from the rear wheels of the car.

In starting the engine as described, it is necessary that the clutches 7, 8 be interengaged instantly, for if ratcheting is permitted, the car will in most cases have slowed down to too low a speed before the jaws interengage, so that the added resistance of cranking the engine will act as a brake on the car and stop the same before the engine shaft has been turned sufficiently to draw fresh charges of gas into the cylinders. The stepped teeth of the clutch jaw are also particularly advantageous when it is desired, or necessary for any reason, to use the compression of the engine as a braking force, as in the middle of a hill when coasting with the engine "dead," as the clutch jaw can be instantly engaged and the braking action brought into effect immediately.

Each lever 14 is pivoted to its shifter by means of the pivot 15 consisting of a sleeve and a locking pin 33, the sleeve extending through openings in the depending ears 16 and through the lever and having a head 34 at one end for engaging the outer face of one of said ears, and the locking pin 33 extending through the sleeve from the other end thereof, and having a head 35 at one end abutting against the outer face of the other of such depending ears 16, the pin having spring arms formed with shoulders 36 at their ends, which interlock with the head of the sleeve, as shown in Fig. 6, and lock the pin in the sleeve. Thus the head 34 of the sleeve and the head 35 of the locking pin hold the pivot in position.

The means for actuating the shifters comprises an axially movable rock shaft 37 journaled in bearings 38 in the case 13 and arranged crosswise of, and above, the shifters 12, the shaft having a plurality of arms 39, 40, 41 thereon for selecting predetermined shifters during the axial movements of the shaft and actuating the selected shifters during the rocking of the shaft, such arms having means for entering transverse notches 42 in arms 43 of the shifters.

The shifter 12 connected to the central or main clutch jaw 7 is always coupled with one of the other shifters, and the arm 39 is formed with an elongated engaging end 44 of sufficient length to be always engaged with the arm 43 of the central or main shifter 12 during all axial positions of the rock shaft 37. The other arms 40, 41 are so spaced that one only is engaged at any time with one of the other shifters. As here shown the arm 41 is common to the shifters producing low and reverse speeds, that is, the shifters operating the movable clutch jaws on the shafts 4, 5, Fig. 1, and such arm normally occupies a neutral position between the arms 43 of such shifters, and shifts from its neutral position in one direction into engagement with one of its companion shifters, and in the other direction into engagement with the other of its companion shifters. The remaining arm 40 is arranged to be normally engaged with the arm 43 of the shifter producing intermediate speed (that is the shifter operating the clutch on the shaft 3) when the arm 41 is in neutral position, and to be out of engagement with such shifter when the arm 41 is engaged with either of its companion shifters.

The rock shaft 37 is movable axially in one direction against the action of the spring 45, and such shaft is operated by a suitable control lever mechanism, several forms of which are well known to those skilled in the art. However, I have a special form of control lever which forms the subject matter of another application Sr. No. 699,383, filed May 24, 1912, but so far as this invention is concerned any lever or means capable of producing axial and rotary movements of the shaft may be employed.

The means for locking the unselected shifters from movement comprises a locking plate 46 slidable in suitable guideways in the case 13 and connected to the shaft 37 to slide axially therewith, said plate being formed with depending locking shoulders 47 spaced apart and relatively located to enter the notches 42 of the arms 43 of the shifters, two shoulders 47 being provided to lock the shifter operating the clutch on the shaft 3, one of these two shoulders being located to lock such shifter when the arm 41 engages one of its companion shifters, and the other of such two shoulders being located to engage such shifter when the arm 41 is shifted in the opposite direction to engage its other shifter. The sliding plate 46 is connected to the rock shaft by the arm 40 which slidably works fore and aft in a slot 48, Fig. 9, in such member 46. The slots 49 through which the other arms 40 and 41 extend are enlarged in order to permit the enlarged engaging ends of said arms to pass through said plate 46.

The main shifter is normally locked from movement by a rock shaft 50, Fig. 7, journaled in the case 13 and having a rock arm 51 on the outside of the case and a rock arm 52 on the inside thereof, the rock arm 52 coacting with means as an upwardly extending arm 53, Figs. 5, 7 and 8, on the main shifter, the rock arm 52 being here shown as having ribs 54 on one side face thereof forming a groove in which works a pin 55 carried by said arm 53, the pin 55 being located between the ribs when the clutch 7 is in neutral position as shown in Fig. 8. Upon the rocking of the arm 52 upwardly, and the shifting of the main shifter to carry the jaw 7 into engagement with the jaw 9, the pin 55 on said arm 53 is moved into position to come in front of one rib 54 when the arm 52 is returned to its position shown in Fig. 8; and upon the shifting of the main shifter to carry the jaw 7 into engagement with the jaw 8, said pin 55 is moved into position to engage the rear side of the other rib 54. The rock shaft 50 is actuated to move the rock arm 52 out of engagement with the pin 55 on the arm 53, by means of a pedal 56 ordinarily utilized in motor cars to release the multiple disk clutch, the pedal being mounted on the side sill of the car and being connected to the rock arm 53 by means of a link 57 connecting the arm 58 associated with the pedal to a coupling lever 59 mounted on a rock shaft 60, the lever 59 having an arm 61 which is connected to the rock arm 51 by a link 62. The rock shaft 60 is provided with the usual yoke 63 which operates the movable abutment member of the disk clutch and is connected thereto by forks as the fork 64. Obviously the clutch jaws cannot be shifted until the pedal 56 is operated. The rock arm 52 extends under the lock plate 46 and moves across the plane of movement thereof, and in order that the arm 52 may move upwardly out of engagement with the pin 55 of the shifter arm 53, the plate 46 is formed with an arched or offset portion 65, Fig. 9.

This gearing is particularly advantageous in that one rock shaft is provided for selecting and shifting any two shiftable members, and in that a simple one piece lock is provided for holding the unselected shifting parts from shifting movement, and further in that the shiftable toothed parts are yieldingly forced to operative position.

What I claim is:

1. In a transmission gearing, a plurality of shiftable members, shifters connected respectively to said members, and means for actuating the shifters comprising an axially movable rock shaft having a plurality of arms for coacting with the shifters, the arms being spaced apart to select two predetermined shifters upon predetermined axial movements of the rock shaft and to move the selected shifters when the shaft is rocked, substantially as and for the purpose described.

2. In a transmission gearing, a main shiftable member and a plurality of additional shiftable members, the main shiftable member acting in conjunction with any one of the additional shiftable members, shifters associated respectively with said members, and means for selecting and actuating the shifters comprising an axially movable rock shaft having a rock arm for actuating the shifter of the main member in all the axial positions of the rock shaft and additional rock arms located so that but one of said arms is effectively engaged with any of the additional shifters in any axial position of the rock shaft, substantially as and for the purpose specified.

3. In a transmission gearing, a main shiftable member and a plurality of additional shiftable members, the main shiftable member acting in conjunction with any one of the additional shiftable members, shifters associated respectively with said members, and means for selecting and actuating the shifters comprising an axially movable rock shaft having a rock arm for actuating the shifter of the main member in all the axial positions of the rock shaft and additional rock arms located so that but one of said arms is effectively engaged with any of the additional shifters in any axial position of the rock shaft, one of the additional rock arms being common to two of the additional shifters and having a neutral position between said two shifters, substantially as and for the purpose set forth.

4. In a transmission gearing, a main shiftable member and a plurality of additional shiftable members, the main shiftable member acting in conjunction with any one of the additional shiftable members, shifters associated respectively with said members, and means for selecting and actuating the shifters comprising an axially movable rock shaft having a rock arm for actuating the shifter of the main member in all the axial positions of the rock shaft and additional rock arms located so that but one of said arms is effectively engaged with any of the additional shifters in any axial position of the rock shaft, one of the additional rock arms being common to two of the additional shifters and having a neutral position between said two shifters, and another of such additional rock arms being arranged to engage its shifter when the former additional rock arm is in neutral position, and to be disengaged therefrom when the rock arm common to said two shifters is engaged with either of its coacting shifters, substantially as and for the purpose described.

5. In a transmission gearing, a main shiftable member, and three additional shiftable members, the main member acting in conjunction with any one of the additional members, or alone, shifters associated respectively with said members, and means for selecting and actuating the shifters comprising an axially movable rock shaft having a main rock arm for actuating the shifter associated with the main member at all times, and two additional rock arms, one of the additional rock arms actuating one of the shifters, and the other rock arm being common to two shifters and being normally in neutral position between said two of the shifters when the former additional rock arm is engaged with its companion shifter, substantially as and for the purpose described.

6. In a transmission gearing, a plurality of shiftable members, shifters connected respectively to said members, means for actuating the shifters comprising an axially movable rock shaft mounted in bearings secured to the gearing-case and having a plurality of operating arms, said rock shaft having two movements, one for selecting and the other for moving the selected shifter, and a locking element separate from the rock shaft and operable by the rock shaft only during the selecting movement thereof, said locking element operating to lock the unselected shifters during the shifting movement of the rock shaft, substantially as and for the purpose described.

7. In a transmission gearing, a support formed with a guide, a plurality of shiftable members, shifters connected respectively, to said members, means for actuating the shifters comprising an axially movable rock shaft mounted in bearings secured to the gearing-case and having means projecting therefrom and coacting with the shiftable members, the rock shaft being movable axially for selecting the member to be shifted, and about its axis for shifting the selected member, and a sliding locking element for locking the unselected shifter, said element being movable in the guide, and connected to the rock shaft to slide axially therewith, said guide preventing movement of the locking element during the rocking of said shaft, substantially as and for the purpose specified.

8. In a transmission gearing, a plurality of shiftable members, shifters connected respectively to said members, means for actuating the shifters comprising an axially movable rock shaft having a plurality of arms for coacting with the shifters, the arms being spaced apart to select two predetermined shifters upon predetermined axial movements of the rock shaft, and a locking element operated by the rock shaft during axial movements thereof to lock the unselected shifters, substantially as and for the purpose set forth.

9. In a transmission gearing, a plurality of shiftable members, shifters connected respectively to said members, means for actuating the shifters comprising an axially movable rock shaft having a plurality of arms for coacting with the shifters, the arms being spaced apart to select two predetermined shifters upon predetermined axial movements of the rock shaft, and a locking element operated by the rock shaft during axial movements thereof to lock the unselected shifters, the locking element comprising a sliding plate connected to the rock shaft to slide axially therewith, said plate being formed with shoulders spaced apart to coact with the unselected shifters and release the selected shifters, substantially as and for the purpose described.

10. In a transmission gearing, a main shiftable member and a plurality of additional shiftable members, the main shiftable member acting in conjunction with any one of the additional shiftable members, shifters associated respectively with said members, means for selecting and actuating the shifters comprising an axially movable rock shaft having a rock arm for actuating the shifter of the main member in all the axial positions of the rock shaft, and additional rock arms located so that but one of said arms is effectively engaged with any of the additional shifters in any axial position of the rock shaft, and a locking element connected to the shaft to slide axially therewith and having shoulders spaced apart for coacting with the shifters, the shoulders being arranged to come into engagement with the unselected shifters and release the selected shifters, substantially as and for the purpose specified.

11. In a transmission gearing, a main shiftable member and a plurality of additional shiftable members, the main shiftable member acting in conjunction with any one of the additional shiftable members, shifters associated respectively with said members, means for selecting and actuating the shifters comprising an axially movable rock shaft having a rock arm for actuating the shifter of the main member in all the axial positions of the rock shaft, and additional rock arms, one of the additional rock arms being common to two of the additional shifters and having a neutral position between said two shifters, and another of such additional rock arms being arranged to engage its shifter when the former additional rock arm is in neutral position, and to be disengaged therefrom when such former rock arm is engaged with either of its coacting shifters, and a slidable locking element connected to the shaft to move axially therewith, the locking element having shoulders spaced apart for coacting with said two additional shifters when the corresponding rock arm is in neutral position, and the locking element also having additional shoulders spaced apart and arranged to engage and lock the remaining additional shifter when either one of said two shifters is selected, substantially as and for the purpose set forth.

12. In a transmission gearing, a plurality of shiftable members, shifters connected, respectively, to said members, means for actuating the shifters comprising an axially movable rock shaft having a plurality of arms, said rock shaft having two movements, one for selecting and the other for moving the selected shifters, and a locking element for locking the unselected shifters during the shifting movement of the rock shaft, and means connecting the rock shaft and the locking element, said means coacting with the locking element during the selecting movement of the rock shaft and moving said element with the rock shaft, and said means being movable independently of the locking element during the shifting movement of the rock shaft, substantially as and for the purpose specified.

13. In a transmission gearing, a plurality of shiftable members, shifters connected, respectively, to said members, means for actuating the shifters comprising an axially movable rock shaft having a plurality of arms, said rock shaft having two movements, one for selecting and the other for moving the selected shifters, and a locking plate arranged between the shifters and the rock shaft substantially parallel with the rock shaft and formed with slots for receiving said arms and permitting the same to move independently of the locking plate, and with an additional transverse slot, said plate having its face contiguous to the shifters provided with shoulders for coacting with the unselected shifters, and an additional arm projecting from the rock shaft and coacting with the opposite side of the additional slot in the locking plate during the selecting movement of the rock shaft and movable lengthwise of said sides independently of the locking plate during the shifting movement of said rock shaft, substantially as and for the purpose set forth.

14. In a transmission gearing, shiftable members, shifters connected respectively to said members, means for selecting and actuating the shifters, a movable locking element for holding the unselected shifters controlled in its operation by said means, and means for normally locking the shifters from movement comprising a rock shaft, and a rock arm extending contiguous to the locking element and movable across the plane of the movement of the locking element, said element being formed with an offset portion for permitting the movement of said rock shaft, substantially as and for the purpose described.

15. In a transmission gearing, a main shiftable power-transmitting member, and a plurality of additional power-transmitting members, the main member acting in conjunction with any of the additional shiftable members, shifters associated respectively with said members, manually operable means for selecting a predetermined additional shifter and for actuating the selected shifter and the main shifter, and means for locking the main shifter from movement, substantially as and for the purpose specified.

16. In a transmission gearing, a main shiftable power-transmitting member, a plurality of additional power-transmitting members, the main member acting in conjunction with any of the additional shiftable members, shifters associated with said members, manually operable means for selecting a predetermined additional shifter and for actuating the selected shifter together with the main shifter, and means operated by the selecting and shifting means during the selecting operation thereof to lock the unselected shifters, manually operable means for normally locking the main shifter from movement, and a controlling lever connected to the last-mentioned locking means, substantially as and for the purpose set forth.

17. In a transmission gearing, a main shiftable power-transmitting member, and a plurality of additional power-transmitting members, the main member acting in conjunction with any of the additional shiftable members, shifters associated respectively with said members, manually operable means for selecting a predetermined additional shifter and for actuating the selected shifter and the main shifter, and means for locking the main shifter from movement, the last-mentioned means comprising a shoulder associated with the main shifter, a rock shaft having an arm formed with means for interlocking with said shoulder, and a control lever connected to the rock shaft, substantially as and for the purpose described.

18. In a transmission gearing, a main shiftable power-transmitting member, a plurality of additional power-transmitting members, the main member acting in conjunction with any of the additional shiftable members, shifters associated with said members, manually operable means for selecting a predetermined additional shifter and for actuating the selected shifter together with the main shifter, means operated by the selecting and shifting means during the selecting operation thereof to lock the unselected shifters, and means for normally locking the main shifter from movement, the last mentioned means comprising a shoulder associated with the main shifter, a rock shaft having an arm provided with means for interlocking with the shoulder, and a manually operable control lever connected to the rock shaft, substantially as and for the purpose specified.

19. In a transmission gearing, a plurality of shiftable members, shifters, manually operable means for selecting and actuating said shifters comprising an axially movable rock shaft having a plurality of arms for coacting with the shifters, the arms being spaced apart to select two predetermined shifters upon predetermined axial movements of the rock shaft, a locking element operated by the rock shaft during the axial movements thereof to lock the unselected shifters, means for normally locking the main shifter from movement, and a manually-operable control lever for operating the last-mentioned means, substantially as and for the purpose set forth.

20. In a transmission gearing, a shiftable member, and means for shifting said member including a movable carriage, a lever pivoted to said carriage and connected to the shiftable member, and a spring carried by the carriage and normally acting to resist pivotal movement of the lever and yield when the shiftable member is temporarily restrained from shifting movement, the spring subsequently acting to complete said movement of the shifting member substantially as and for the purpose described.

21. The combination of a plurality of pairs of toothed power transmitting members, one member of each pair being shiftable into and out of interlocking engagement with the other member of said pair, means for shifting the shiftable members of the pairs including shifters associated respectively, with the pairs, a common actuator for the shifters, means for transmitting the motion of the shifters to the shiftable members including movable parts carried by the shifters, and springs for yieldingly holding said parts from movement relatively to the shifters, substantially as and for the purpose specified.

22. The combination of a plurality of pairs of toothed power-transmitting members, one member of each pair being shiftable into and out of interlocking engagement with the other member of such pair, means for shifting the shiftable members including shifters for the shiftable members, respectively, fork levers pivoted to the shifters and connected to the shiftable members, springs carried by the shifters and acting on the fork levers permitting the fork levers to yield during the movement of the shifters to engage the members of the pairs, and a common actuator for the shifters, substantially as and for the purpose set forth.

23. The combination of a plurality of pairs of toothed power-transmitting members, one member of each pair being shiftable into and out of interlocking engagement with the other member of said pair, means for shifting the shiftable members of the pairs including shifters associated respectively with the pairs, a common actuator for the shifters, means for transmitting the motion of the shifters to the shiftable members including movable parts carried respectively by said shifters, springs for yieldingly holding said parts from movement relatively to the shifters, said parts comprising levers pivoted between their ends to the shifters respectively, one arm of each lever being connected to one of the shiftable toothed members, and a spring carried by each shifter and acting on the other arm of the lever, substantially as and for the purpose described.

24. The combination of a plurality of pairs of toothed power-transmitting members, one member of each pair being shiftable into and out of interlocking engagement with the other member of said pair, means for shifting the shiftable members of the pairs including shifters associated respectively with the pairs, a common actuator for the shifters, means for transmitting the motion of the shifters to the shiftable members including movable parts carried respectively by said shifters, said parts comprising levers pivoted between their ends to the shifters, one arm of each lever being connected to one of the shiftable toothed members, and a spring carried by each shifter and acting on the other arm of the companion lever, and each shifter being formed with an abutment against which the spring normally holds the associated lever, substantially as and for the purpose specified.

25. The combination of a plurality of pairs of toothed power-transmitting members, one member of each pair being shiftable into and out of interlocking engagement with the other member of said pair, means for shifting the shiftable members of the pairs including shifters associated respectively with the pairs, a common actuator for the shifters, means for transmitting the motion of the shifters to the shiftable members including movable parts carried respectively by said shifters, said parts comprising levers pivoted between their ends to the shifters, one arm of each lever being connected to one of the shiftable toothed members, and a spring carried by each shifter and acting on the other arm of the associated lever, said spring being arranged parallel to the shifters, substantially as and for the purpose set forth.

In testimony whereof, I have hereunto signed my name in the presence of two attesting witnesses, at Syracuse, in the county of Onondaga, in the State of New York, this 17th day of April, 1912.

CLARK W. PARKER.

Witnesses:
S. DAVIS,
L. M. DAVIS.